(12) United States Patent
Torpy et al.

(10) Patent No.: US 10,573,310 B2
(45) Date of Patent: Feb. 25, 2020

(54) VOICE-ACTIVATED ENERGY MANAGEMENT SYSTEM

(71) Applicant: Landis+Gyr Innovations, Inc., Alpharetta, GA (US)

(72) Inventors: Keith Mario Torpy, Sydney (AU); James Randall Turner, Alpharetta, GA (US); David Decker, Atlanta, GA (US); Ruben E. Salazar Cardozo, Johns Creek, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/122,941

(22) Filed: Sep. 6, 2018

(65) Prior Publication Data

US 2019/0074007 A1 Mar. 7, 2019

Related U.S. Application Data

(60) Provisional application No. 62/554,734, filed on Sep. 6, 2017.

(51) Int. Cl.
*G10L 15/22* (2006.01)
*G06Q 50/06* (2012.01)
(Continued)

(52) U.S. Cl.
CPC ............ *G10L 15/22* (2013.01); *G06Q 20/145* (2013.01); *G06Q 50/06* (2013.01); *G10L 13/043* (2013.01);
(Continued)

(58) Field of Classification Search
CPC ......... G10L 13/08; G10L 15/22; G10L 15/26; G10L 15/265; G10L 2015/221;
(Continued)

(56) References Cited

U.S. PATENT DOCUMENTS 7,197,461 B1 * 3/2007 Eberle .................... G10L 15/26
704/270.1
8,509,953 B2 * 8/2013 Taft ........................ G01D 4/002
700/286

(Continued)

OTHER PUBLICATIONS

Wikipedia, "Serverless computing", 6 Pages, downloaded May 1, 2019. (Year: 2019).*

(Continued)

*Primary Examiner* — Martin Lerner
(74) *Attorney, Agent, or Firm* — Kilpatrick Townsend & Stockton LLP

(57) ABSTRACT

A method for responding to a voice activated request includes receiving a speech input request from a smart speaker requesting energy management data associated with energy consumption at a premises of the smart speaker. The method also includes generating a voice service request including a first query for a first data source. The first query includes a request for the energy management data. Additionally, the method includes communicating the first query to the first data source and receiving a first response to the first query from the first data source. Further, the method includes generating an audible speech output in response to the speech input request based on the first response to the first query and transmitting the audible speech output to the smart speaker. The smart speaker audibly transmits the audible speech output.

9 Claims, 6 Drawing Sheets

(51) Int. Cl.
*G10L 13/04* (2013.01)
*G10L 15/26* (2006.01)
*G06Q 20/14* (2012.01)
*G10L 15/30* (2013.01)

(52) U.S. Cl.
CPC ............ *G10L 15/265* (2013.01); *G10L 15/30* (2013.01); *G10L 2015/223* (2013.01)

(58) Field of Classification Search
CPC .. G10L 2015/223; G06Q 20/42; G06Q 50/06; H04W 4/33
USPC ...................... 704/270, 270.1, 275
See application file for complete search history.

(56) References Cited

U.S. PATENT DOCUMENTS

| | | | | |
|---|---|---|---|---|
| 9,491,005 | B2* | 11/2016 | Lee | H04L 12/66 |
| 2003/0078784 | A1* | 4/2003 | Jordan | G06F 3/16 |
| | | | | 704/275 |
| 2004/0093209 | A1* | 5/2004 | Okutani | G10L 15/193 |
| | | | | 704/231 |
| 2004/0121786 | A1* | 6/2004 | Radcliffe | H04W 40/02 |
| | | | | 455/500 |
| 2012/0166233 | A1* | 6/2012 | Wengrovitz | G06Q 10/063 |
| | | | | 705/7.11 |
| 2012/0280833 | A1* | 11/2012 | Jonsson | G06F 13/385 |
| | | | | 340/870.02 |
| 2013/0138250 | A1* | 5/2013 | Mowery | G05D 23/1917 |
| | | | | 700/276 |
| 2014/0029415 | A1* | 1/2014 | Osterloh | H04L 41/0668 |
| | | | | 370/221 |
| 2015/0163535 | A1* | 6/2015 | McCarthy, III | G10L 17/22 |
| | | | | 725/49 |
| 2017/0006135 | A1* | 1/2017 | Siebel | H04L 67/02 |
| 2017/0134182 | A1* | 5/2017 | Davis | H04W 4/70 |
| 2017/0169506 | A1* | 6/2017 | Wishne | G10L 15/1822 |
| 2018/0114127 | A1* | 4/2018 | Cole | G06F 17/2775 |
| 2018/0146268 | A1* | 5/2018 | Scoggins | H04Q 9/02 |
| 2018/0233127 | A1* | 8/2018 | Visser | G10L 13/047 |
| 2019/0095444 | A1* | 3/2019 | Payne | G10L 15/08 |

OTHER PUBLICATIONS

"EDF Energy and Alexa Give Customers More Control Over Their Energy Accounts", Alexa Blogs, Available Online at https://developer.amazon.com/blogs/alexa/post/91195f78-1c5c-4279-985b-0680e8a360a9/edf-energy-and-alexa-give-customers-more-control-over-their-energy-accounts, Dec. 22, 2016, pp. 1-6.

"EDF Energy Launches Voice Controlled Energy Accounts with Amazon Alexa", EDF Energy, Available Online at https://www.edfenergy.com/media-centre/news-releases/edf-energy-launches-voice-controlled-energy-accounts-amazon-alexa, Sep. 14, 2016, pp. 1-2.

Arriany et al., "Applying Voice Recognition Technology for Smart Home Networks", 2016 International Conference on Engineering & MIS (ICEMIS), Sep. 22, 2016, pp. 1-6.

International Patent Application No. PCT/US2018/049639, "International Search Report and Written Opinion", dated Nov. 2, 2018, 11 pages.

* cited by examiner

VOICE-ACTIVATED ENERGY MANAGEMENT SYSTEM

CROSS-REFERENCE TO RELATED APPLICATION

This disclosure claims priority to U.S. Provisional Application No. 62/554,734, entitled "Voice-Activated Energy Management System," filed Sep. 6, 2017, the entirety of which is hereby incorporated by reference herein.

TECHNICAL FIELD

This disclosure relates generally to apparatuses and processes for voice-activated management of resource consumption. More particularly this disclosure relates to using voice controls to obtain information associated with energy consumption and to manage energy consumption, including managing payment for energy consumption.

BACKGROUND

Networks, such as power, gas, and water distribution systems, are used to deliver resources from sources (e.g., power stations, gas gate stations, water storage tanks, and other utility providers) through a network of delivery infrastructure to load devices located in dwellings, businesses, or other premises containing load devices. When the load devices consume the resources, metering devices associated with the premises track the consumption.

While the metering devices accurately track resource consumption, utility consumers are typically unable to easily obtain current information about the resource consumption. As an example, information about resource consumption may be available to the utility consumers on a time delay. Such a time delay may be associated with receiving a utility bill at the end of the month. Further, accessing the available resource consumption information involves accessing a web portal on a computer device or waiting to receive paper or electronic communications from a utility provider. Thus, accessing resource consumption information and managing costs associated with resource consumption are inhibited by incomplete and untimely data provided by the utility providers.

SUMMARY

Aspects and examples are disclosed for apparatuses and process for voice-activated management of resource consumption. For instance, a method for responding to a voice activated request includes receiving a speech input request from a smart speaker requesting energy management data associated with energy consumption at a premises of the smart speaker. The method also includes generating a voice service request. The voice service request includes a first query for a first data source, where the first query includes a request for the energy management data. Additionally, the method includes communicating the first query to the first data source and receiving a first response to the first query from the first data source. Further, the method includes generating an audible speech output in response to the speech input request based on the first response to the first query and transmitting the audible speech output to the smart speaker capable of audibly transmitting the audible speech output.

In an additional example, a device located at a consumption premises includes a meter. The meter includes a metrology module to measure consumption of a resource, a memory to store data associated with the metrology module, and a communications module to communicate with other devices and with a head end system in a metering device network using a first networking protocol. The meter also includes a processing unit that communicates with a voice service using a second networking protocol, where the meter and the processing unit are connected using a link internal to the device.

In an additional example, a method for responding to a voice activated request includes receiving a speech input request from a smart speaker. The method also includes generating a voice service request based on the speech input request. The voice service request includes a query for an energy consumption data source. Additionally, the method includes communicating the query to the energy consumption data source and receiving a response to the query from the energy consumption data source. Further, the method includes generating an audible speech output in response to the speech input request based on the response to the query and transmitting the audible speech output to the smart speaker to audibly transmit the audible speech output These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for voice-activated management of resource consumption. For example, within a utility distribution network, a device, which may include metrology components, communication components, a processing unit, etc., is located at a consumption premises. The consumption premises may be a home or business location that includes utility consuming devices. The device may include a meter, which itself may include a metrology module used to measure consumption of a resource at the consumption premises. The meter may also include a communications module that wirelessly communicates with other devices in a wireless mesh network and with a head end system using a first networking protocol.

To initiate a voice-activated request from a user communicating with the device, the device may also include a processing unit. In one or more examples, the meter and the processing unit are connected using a link internal to the device. The processing unit processes communications signals received from a voice service. The voice service receives voice-activated requests from a smart speaker associated with the device, processes the requests into commands understandable by the device, and provides the requests to the device for processing by the processing unit. Other devices and systems may also interact with the voice service to provide energy management data to the voice service. For example, the other devices and systems may include payment service platforms, appliance vendor platforms, internet of things (IoT) devices, a utility provider, or any other source of energy management data that is capable of communicating with the voice service.

Certain aspects described herein are applied to the management of resource consumption and thereby improve user control over resource consumption and user access to utility data. In particular, certain voice-activated management systems and methods described herein improve existing access to utility data by a consumer. For example, existing systems lack the capability of providing consumers with real-time or near real-time data regarding the consumption of a resource at a premises, or the capability of providing consumers with data that is actual usage or consumption data and not simply an estimate of the usage or consumption. However, certain implementations described herein provide a specific process that provides the consumer with access to resource consumption data, which is the same resource consumption data used by the utility when generating a utility bill. Thus, in contrast to conventional systems relating to resource consumption management, a voice-activated management system that uses a voice-activated request to receive resource consumption data from a meter or other energy management data from other resources can more effectively manage resource consumption based on enhanced completeness and timeliness of the resource consumption data.

Figure 1:
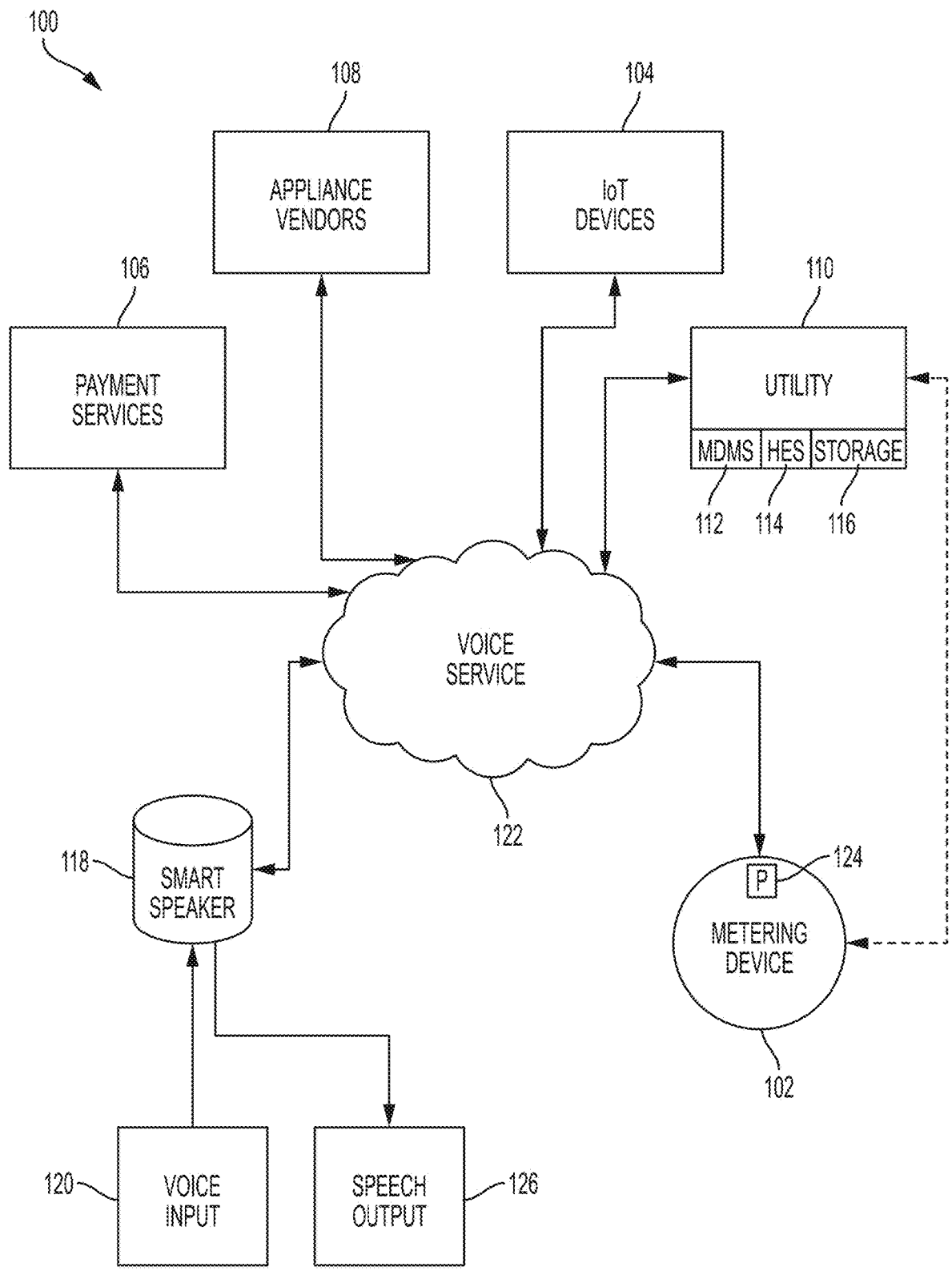
FIG. 1 is a block diagram illustrating an example of a data flow for voice-activated querying of resource consumption information, in accordance with one or more examples.

FIG. 1 is a block diagram illustrating an example of a voice-activated management system 100. The voice-activated management system 100 provides an example of a data flow for voice-activated querying of resource consumption information. As illustrated, the system 100 includes a metering device 102, which is used to track consumption of a resource at a location associated with the metering device 102 (e.g., a metering device node coupled to a wireless mesh network and a grid network). While only a single metering device 102 is depicted, additional metering devices 102 are also contemplated within the system 100. For example, a premises may include multiple metering devices 102 servicing different portions of the premises. Additionally, multiple metering devices 102 located at several different premises may be associated with a single utility payor. Further, a network of Internet of Things (IoT) devices 104 may include metering devices 102 or other IoT devices with access to the system 100. The consumption of a resource that is tracked by the metering device 102 may include electricity, gas, water, or any other consumable that is capable of being tracked by the metering device 102. Resource consumption, or information relating to resource consumption, may also be provided from payment services companies 106 (e.g., banks), communication platforms of appliance vendors 108 (e.g., communication platforms for HVAC vendors, household appliance vendors, etc.), and the utility providers 110.

In an example, the payment service companies 106 may provide information relating to payments from a consumer to resource providers associated with resource consumption of the consumer. The communication platforms of the appliance vendors 108 may provide a user with platforms to communicate with appliances manufactured or distributed by the appliance vendors. For example, each appliance vendor may have a communication scheme or security protocol that is different from other appliance vendors. Thus, the communication platforms of the appliance vendors 108 may provide users with the communication scheme and security protocols that enable communication with appliances to receive data associated with how the appliances consume a resource. Further, the utility providers 110 may provide information directly related to overall resource consumption at a location. The information from the utility providers 110 may be accessed through a meter data management system 112, a head end system 114, or any other data storage 116 associated with the utility providers 110.

To receive resource consumption data from the metering device 102 or other data relating to resource consumption, a smart speaker 118 may receive a voice input 120 from a consumer. The smart speaker 118 may be any speaker connected to the internet that is capable of receiving speech data (e.g., the voice input 120) from a consumer. In this manner, the smart speaker 118 provides a voice-activated user interface for the consumer. In one or more examples, the smart speaker 118 may include a hands-free speaker such as Amazon Echo® by Amazon Technologies, Inc. or Google Home™ by Google LLC. In a another example, any other device with a voice interface may be used in addition to or in place of the smart speaker 118. For example, a cell phone or any other device that includes speech recognition support (e.g., support from a voice service 122, as discussed below) and is capable of connecting to the internet and receiving speech data may be used in in addition to or in place of the smart speaker 118. Further, while the discussion below generally references the smart speaker 118, other devices capable of replacing the smart speaker 118 may perform similar functions to those of the smart speaker 118 described in detail below. Collectively, any devices interacting using voice communication with the voice service 122 to receive information from the metering device 102, the IoT devices 104, the payment services companies 106, the communication platforms of appliance vendors 108, and the utility providers 110 may be described as the smart speaker 118.

When the smart speaker 118 receives the voice input 120, the smart speaker 118 provides the voice input 120 to the voice service 122. In one or more examples, the voice input 120 is a vocal request for resource consumption information, and the resource consumption information may be received from any combination of the metering device 102, the utility providers 110, or any other available data source. The voice input 120 may also be a vocal request for utility account information from the metering device 102 or the utility providers 110. The smart speaker 118 may be associated with the specific metering device 102 based on a utility account associated with both the smart speaker 118 and the metering device 102 (e.g., from the utility providers 110), or the smart speaker 118 may be directly associated with the metering device 102 using a unique identification number or code of the metering device 102. The resource consumption information may include resource consumption for the current billing period, historical resource consumption data, resource consumption trends, average resource consumption for appliances located within the house, any additional resource consumption information stored by the utility providers 110, any additional resource consumption or management information accessible by the metering device 102, the IoT devices 104, the payment services companies 106, or the communication platforms of appliance vendors 108, or any combination thereof. The utility account information, which may be located at the utility providers 110, the metering device 102, or both, may include a pre-paid balance of the account, the current resource consumption billing rate associated with the account, the month to date (or other time period to date) charges accrued based on consumption, any additional account information, or any combination thereof.

In some examples, the voice service 122 is a voice platform that processes voice commands and performs actions to support the voice commands, including communicating with external systems (e.g., the metering device 102, the IoT devices 104, the payment services companies 106, the communication platforms of appliance vendors 108, the utility providers 110, or any combination thereof). In such an example, the voice service 122 receives the voice input 120 from the smart speaker 118 and processes the voice input 120 to characterize the request of the consumer as a specific processing task. For example, the voice service 122 may convert the voice input 120 from audio data into text representations of the audio data or into specific computer-readable tasks that are mapped to the audio data.

To accomplish processing of the voice input 120, the voice service 122 may include a computing component. The computing component, for example, may be an event-driven, serverless computing platform. The computing component may execute lines of code in response to tasks received or identified by the voice service 122. When the tasks are received by the computing component, the computing component may assign computing resources to accomplish the tasks identified by the voice service 122 from the voice input 120. In one or more examples, the voice service 122 performs a speech-to-text operation on the voice input 120 and provides text data associated with the voice input 120 to the computing component. In such an example, the computing component matches the text data associated with the voice input 120 to a register of known requests to determine a specific task that the computing component is instructed to accomplish by the voice input 120.

In one or more examples, the computing component of the voice service 122 receives the text data associated with the voice input 120 and determines that the text data is requesting consumption data recorded by the metering device 102 for the current month and a cost associated with the consumption data. The voice service 122 may then generate a computer task to request consumption data from the metering device 102 or the utility provider 110. For example, the computer task may instruct the metering device 102 or the utility provider 110 to provide specific information to the voice service 122 (e.g., resource consumption data, resource consumption cost, etc.), or the computer task may instruct the metering device 102 or the utility provider 110 to provide a complete response to the voice input 120 (e.g., "you have consumed 600 kilowatt hours so far this month" or "your current bill for this month is fifty dollars"). Thus, compilation of the complete response may be provided at either the voice service 122 or the data sources (i.e., the metering device 102 or the utility provider 110) depending on processing capabilities of the data sources and what data is available to the data source.

The computer task generated by the voice service 122 may be directed by the voice service 122 to a processor 124 located within or associated with the metering device 102. In another example, the voice service 122 may direct the task to the utility provider 110 to receive the consumption data stored at the utility provider 110. While the above example describes a request for consumption data recorded by the metering device 102 or the utility provider 110, other types of data may also be requested from the metering device 102, the utility provider 110, or any other data source with which the voice service 122 is capable of communicating. For example, the metering device 102 may record and provide an indication of an instant power, a temperature of the metering device 102, or any other type of data that is recorded by the metering device 102.

The processor 124 may receive the task, parse the task, and query the metering device 102 for the requested information. The metering device 102 may maintain the requested information available locally (e.g., the current resource consumption amount), or, in an example, the metering device 102 may query a head end system 114 associated with the metering device 102 to obtain information relating to the task received by the metering device 102. In other examples, the voice service 122 may generate multiple tasks based on the voice input 120. In such examples, the voice service 122 may parse the voice input 120 and determine which data source should be queried to obtain the information requested by the voice input 120. For example, if the voice input 120 requests a month-to-date update on billing, the voice service 122 may generate a task sent to the metering device 102 requesting total month-to-date energy consumption, and the voice service 122 may generate an additional task sent to the utility provider 110 requesting a price per unit of the energy consumption. Once responses are received from the metering device 102 and the utility provider 110, the voice service 122 may multiply the total month-to-date energy consumption by the price per unit of the energy consumption to generate a month-to-date bill update (i.e., a cost of energy already consumed in the current billing period).

In an example, the voice service 122 may provide a single task based on the voice input 120 and provide the single task to the metering device 102 or the utility provider 110. If the metering device 102 or the utility provider 110 has enough information available locally to respond to the single task, the metering device 102 or the utility provider 110 may, for example, calculate the total month-to-date bill update and provide that information to the voice service 122. If the metering device 102 or the utility provider 110 does not have enough information available locally for the response, the metering device 102 or the utility provider 110 may request the information from other data sources or inform the voice service 122 that additional data is requested from another data source.

In one or more examples, the utility provider 110 may receive a task from the voice service 122 to provide energy management data to the voice service 122. The energy management data may be associated with a premises of the smart speaker 118. Because the communication network (e.g., a wireless mesh network), across which the metering device 102 communicates metrology data (e.g., resource consumption information for a time period, an indication of an instant power consumption rate, a temperature of the metering device 102, or any other type of data that is recorded by the metering device 102), may be lossy in nature, the metrology data stored at the utility provider 110 may be stale due to the loss of updates from the metering device 102 over the communication network. If the utility provider 110 determines that the metrology data is too old to provide accurate energy management data to the voice service 122, the utility provider 110 may transmit a request to the metering device 102 for a metrology data update. Upon receiving updated metrology data from the metering device 102, the utility provider 110 may provide a response to the voice service 122.

The communication between the voice service 122 and the metering device 102 may be different from the communication between the voice service 122 and the utility provider 110 or other data source. Additionally, communication between the metering device 102 and the head end system 114 may be also be performed using a different communication protocol from the other types of communication. For example, the voice service 122 may communicate with the utility provider 110 or other remote data sources using a Hypertext Transfer Protocol Secure (HTTPS) protocol over a wired or WiFi network. Further, the voice service 122 may communicate with the metering device 102 or other data sources local to the smart speaker 118 using a ZigBee communication protocol or other form of wireless communication protocol. Additionally, the communication between the metering device 102 and the head end system 114 may communicate across a wireless mesh network using radio frequency (RF) time slotted channel hopping (TSCH) protocol or a cellular protocol. In one or more examples, upon receipt of the communication from the metering device 102 by a collector en route to the head end system 114, the communication protocol may change resulting in the use of multiple communication protocols between the metering device 102 and the head end system 114. Other networking protocols are also contemplated within the scope of the present disclosure for communication between the voice service 122 and available data sources (e.g., the metering device 102, the IoT devices 104, the payment service companies 106, the communication platforms of appliance vendors 108, the utility providers 110, or any other data sources), as well as between the metering device 102 and the head end system 114.

Additionally or alternatively, if the requested information is available in the MDMS 112, the head end system 114, or the data storage 116 of the utility provider 110, the voice service 122 may provide the task directly to the utility provider 110 requesting the information. Such a direct request may include providing the head end system 114 with access credentials and information for the account associated with the metering device 102. A communication path between the computing service 204 and the head end system 114 may be accomplished across the internet. The response from the head end system 114 may include the requested information relating to the metering device 102 (e.g., historic consumption).

As used herein, the term "head end system" (e.g., the head end system 114) may refer to a system of hardware and software that receives a stream of meter data from the metering device 102. The head end system 114 also has access to consumer account information with the utility provider 110. Accordingly, when the voice service 122 or the metering device 102 requests the account information from the head end system 114, the head end system 114 is able to transfer the account information (e.g., resource consumption billing rate) back to the voice service 122 or the metering device 102.

When the requested information from the metering device 102, the IoT devices 104, the payment services companies 106, the communication platforms of appliance vendors 108, the utility provider 110, or any combination thereof is received at the voice service 122, the received information is used to prepare a response to the original request from the voice input 120. For example, if the original request was for the current balance on a utility bill, the voice service 122 multiplies current resource consumption received from the metering device 102 or the utility provider 110 by the current resource consumption billing rate received directly from the utility provider 110 (e.g., via the MDMS 112, the head end system 114, or any other data storage 116 associated with the utility providers 110) or from the head end system 114 through the metering device 102. The metering device 102 may, for example, determine the current resource consumption by tracking resource consumption since completion of a prior billing cycle. In another example, the current resource consumption may be obtained by the voice service 122 directly from the head end system 114. Once the response is generated in text form by the voice service 122 (e.g., "Your current balance for the month is $43.38"), the voice service 122 performs a text-to-speech operation and streams the resulting audio data to the smart speaker 118 for transmission from the smart speaker 118 as speech output 126.

While the discussion of FIG. 1 generally describes a request for a current balance associated with resource consumption, other requests are also contemplated within the scope of the present disclosure. For example, a consumer may have a prepaid utility account. In such an account, the consumer may request a real-time indication of how much money remains in a prepaid balance. The process would be similar to the data flow of FIG. 1 except the account information provided by the head end system 114 would include a remaining prepaid balance for the consumer. Other requests may include a request to pay a specified amount of money toward a utility bill, a request for an indication of total energy usage, a request for an indication of energy usage over a specified period of time, a request for energy saving techniques, a request to shut-down non-essential energy consumption devices when leaving the house (e.g., turning lights off, adjusting a thermostat temperature, etc.), a request for a pre-paid account balance and an indication of when the pre-paid account balance is expected to run out, a request for notifications from the utility provider 110, or any other requests associated with energy usage. In response to the requests, the voice service 122 queries the appropriate sources of data and responds with the speech output 126 that provides an appropriate response to the consumer.

In one or more examples, the voice service 122 may also include an extrapolation component. The extrapolation component may provide additional useful information to the user associated with the request provided by the voice input 120. For example, a consumer may request an indication of a pre-paid account balance. In response, the voice service 122 may provide the pre-paid account balance as the speech output 126, and the voice service 122 may also provide the consumer with an indication of when the pre-paid account balance will run out based on a current rate of consumption. The extrapolation component may also provide other forms of extrapolated information to a consumer based on the specific request of the consumer.

In one or more examples, the consumer discussed above with respect to FIG. 1 may also be a prosumer. That is, the consumer may both consume the resource and generate and provide the resource to a resource network. For example, the consumer's premises may include a wind turbine, an array of solar cells, or any other energy producing device. In such an example, any energy produced by the energy producing device in excess of the needs of the consumer may be provided back to the energy grid. The energy provided back to the utility may provide the consumer with a credit offset as payment for the energy that the consumer provides to the energy grid. When the consumer asks the smart speaker 118 for information about resource consumption, the metering device 102 and/or the head end system 114 may provide the consumer with information regarding energy bought back by the utility and how the energy buy back affects the consumer's power bill.

In an example, the utility provider 110, or other entity in communication with the voice service 122, may push notifications to the smart speaker 118. For example, a user may initialize a request using the smart speaker 118 for a notification of when a specified energy consumption threshold is reached for the month. In response, the utility provider 110, or other entity with access to the energy consumption data, may push a notification, using the voice service 122, to the smart speaker 118 when the energy consumption threshold is reached. In an example, the pushed notification may be repeated at regular intervals until the notification is verbally acknowledged by the user as a voice input 120. Other notifications associated with energy management data may be initialized by a user and pushed to the smart speaker 118 in a similar manner.

Figure 2:
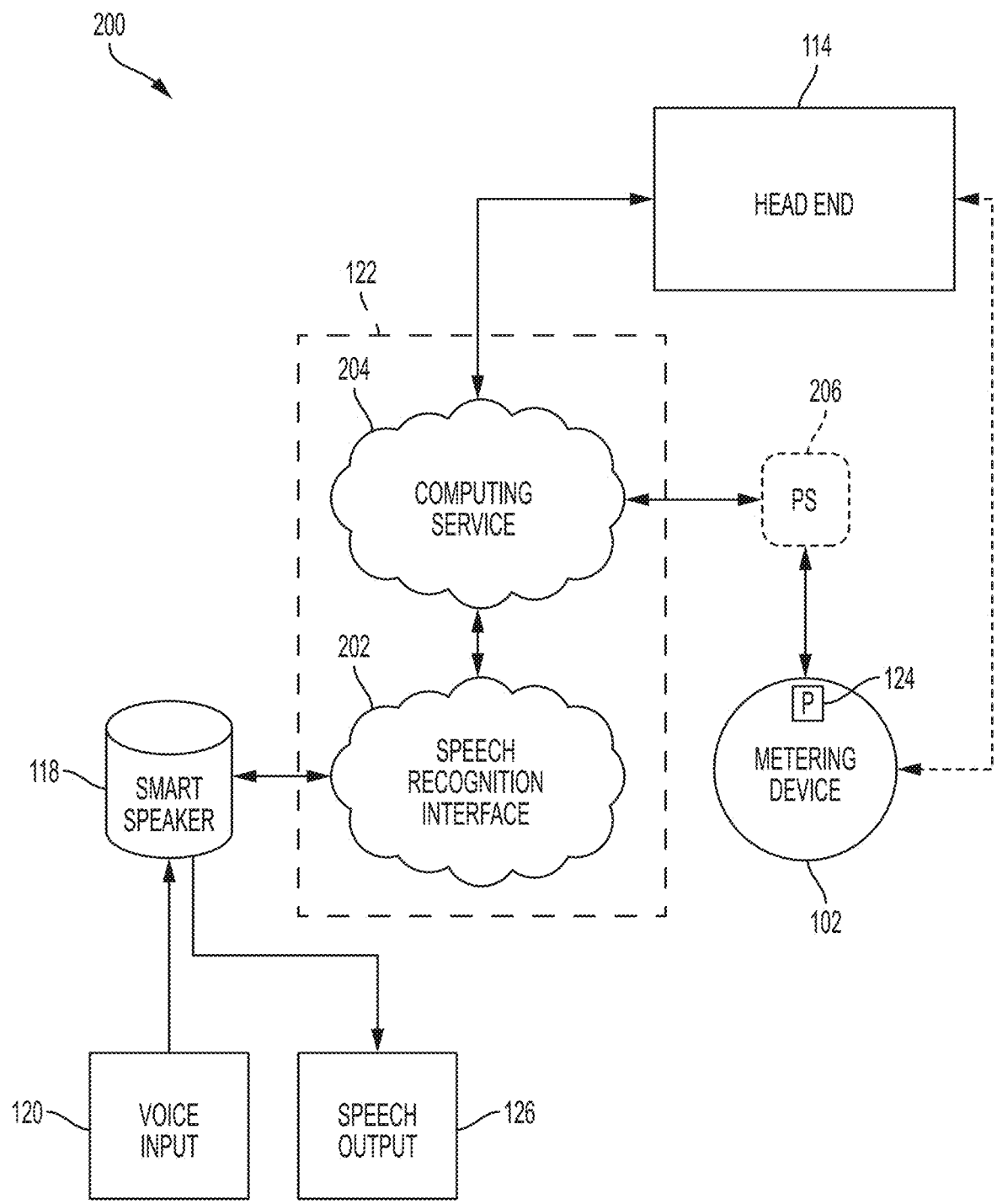
FIG. 2 is a block diagram illustrating an example of a data flow for voice-activated querying of a metering device and a head end of a resource consumption system, in accordance with one or more examples.

FIG. 2 is a block diagram illustrating an example of a voice-activated management system 200. The voice-activated management system 200 may provide details of a specific task contemplated by the voice-activated management system 100, described above with respect to FIG. 1, to provide a utility consumer with access to real-time resource consumption information from the consumer's metering device 102 or the head end system 114 of the utility provider 110. As illustrated, the system 200 includes the metering device 102, which is used to track consumption of a resource at a location associated with the metering device 102 (e.g., a metering device node of a wireless mesh network). While only the single metering device 102 is depicted, additional metering devices 102 are also contemplated within the system 200. For example, a premises may include multiple metering devices 102 servicing different portions of the premises. Additionally, multiple metering devices 102 located at several different premises may be associated with a single utility account. The consumption of a resource that is tracked by the metering device 102 may include electricity, gas, water, or any other consumable that is capable of being tracked by the metering device 102.

To receive resource consumption data from the metering device 102, the smart speaker 118 receives a voice input 120 from a consumer. When the smart speaker 118 receives the voice input 120, the smart speaker 118 provides the voice input 120 to a speech recognition interface 202 of the voice service 122. In one or more examples, the voice input 120 is a vocal request for resource consumption information from the metering device 102 or the head end system 114 and/or a vocal request for utility account information from the metering device 102 or the head end system 114. The smart speaker 118 may be associated with the specific metering device 102 based on a utility account associated with both the smart speaker 118 and the metering device 102, or the smart speaker 118 may be directly associated with the metering device 102 using a unique identification number or code of the metering device 102. The resource consumption information may include resource consumption for the current billing period, historical resource consumption data, resource consumption trends, any additional resource consumption information stored at a head end system 114, any additional resource consumption information accessible by the metering device 102, or any combination thereof. The utility account information, which may be located at the head end system 114, the metering device 102, or both, may include a pre-paid balance of the account, the current resource consumption billing rate associated with the account, the month to date (or other time period to date) charges accrued based on consumption, analytics data such as consumption forecasting information based on historical data, any additional account information, or any combination thereof.

In some examples, the speech recognition interface 202 is a voice platform that processes voice commands and performs actions to support the voice commands, including communicating with external systems. In such an example, the speech recognition interface 202 receives the voice input 120 from the smart speaker 118 and processes the voice input 120 to characterize the request of the consumer as a specific processing task. For example, the speech recognition interface 202 converts the voice input 120 from audio data into text representations of the audio data.

To accomplish processing of the voice input 120, the voice service 122 may also include a computing service 204. The computing service 204, for example, may be an event-driven, serverless computing platform. The computing service 204 executes lines of code in response to tasks received or identified by the speech recognition interface 202. When the tasks are received by the computing service 204, the computing service 204 assigns computing resources to accomplish the tasks identified by the speech recognition interface 202. In one or more examples, the speech recognition interface 202 performs a speech-to-text operation on the voice input 120 and provides text data associated with the voice input 120 to the computing service 204. In such an example, the computing service 204 matches the text data associated with the voice input 120 to a register of known requests to determine a specific task that the computing service 204 is instructed to accomplish by the voice input 120. Other methods of mapping the text data to specific tasks by the computing service 204 are also contemplated.

In one or more examples, the computing service 204 receives the text data associated with the voice input 120 and determines that the text data is requesting consumption data recorded by the metering device 102 for the current month and a cost associated with the consumption data. The computing service 204 may then make a voice service request to an optional public, static proxy server 206. The optional proxy server 206 may be used to redirect the voice service request to the processor 124 located within or associated with the metering device 102 when an IP address for the processor 124 is dynamic and/or the processor 124 is behind a firewall that blocks incoming web based requests directly from the computing service 204. When the IP address is not dynamic and the processor 124 is not behind a firewall, the computing service 204 may communicate directly with the processor 124 without communicating through the optional proxy server 206. The voice service requests from the computing service 204 may also be referred to as text representations of the voice input 120 received by the smart speaker 118. For example, the voice service requests may be computing commands or tasks for the processor 124 to execute upon receipt. While the above example describes a request for consumption data recorded by the metering device 102, other types of data may also be requested. For example, the metering device 102 may record and provide an indication of an instant power consumption value, a temperature of the metering device 102, or any other type of data that is recorded by the metering device 102.

The processor 124 receives the voice service request from the optional proxy server 206 or directly from the voice service 122, parses the voice service request, and queries the metering device 102, the head end system 114, or both for the requested information. The metering device 102 either maintains the requested information available locally (e.g., the current resource consumption amount) or the metering device 102 may query the head end system 114 of a mesh network of utility meters. Additionally or alternatively, if the requested information is available in the head end system 114, the computing service 204 may generate the request command directly to the head end system 114. Such a direct request may include providing the head end system 114 with access credentials and information for the account associated with the metering device. A communication path between the computing service 204 and the head end system 114 may be accomplished across the internet. The response from the head end system 114 may include the requested information relating to the metering device 102 (e.g., historic consumption). Further, in an example using the optional proxy server 206, the communication between the optional proxy server 206 and the processor 124 may use Hypertext Transfer Protocol Secure (HTTPS) over a WiFi network. Other networking protocols are also contemplated within the scope of the present disclosure for both the communication between the metering device 102 and the head end system 114 and the communication between the optional proxy server 206 and the processor 124.

As used herein, the term "head end" (e.g., the head end system 114) may refer to a system of hardware and software that receives a stream of meter data from the metering device 102. The head end system 114 also has access to consumer account information with the utility. Accordingly, should the metering device 102 request the account information from the head end system 114, the head end system 114 is able to transfer the account information (e.g., resource consumption billing rate) back to the metering device 102. Thus, the metering device 102 is able to provide the account information and/or resource consumption information to the optional proxy server 206 or directly to the voice service 122.

At the computing service 204, the information received from the metering device 102, directly from the head end system 114, or both is used to prepare a response to the original request. For example, if the original request was for the current balance on a utility bill, the computing service 204 multiplies current resource consumption received from the metering device 102 or the head end system 114 by the current resource consumption billing rate received directly from the head end system 114 or from the head end system 114 through the metering device 102. The metering device 102 may, for example, determine the current resource consumption by tracking resource consumption since completion of a prior billing cycle. In another example, the current resource consumption balance may be obtained by the computing service 204 directly from the head end system 114. Once the response is generated in text form by the computing service 204 (e.g., "Your current balance for the month is $43.38"), the speech recognition interface 202 performs a text-to-speech operation and streams the resulting audio data to the smart speaker 118 for transmission from the smart speaker 118 as the speech output 126. In another example, the processor 124 may prepare the response to the original request, and the computing service 204 may receive the response from the processor 124 and transmit the response to the speech recognition interface 202.

Figure 3:
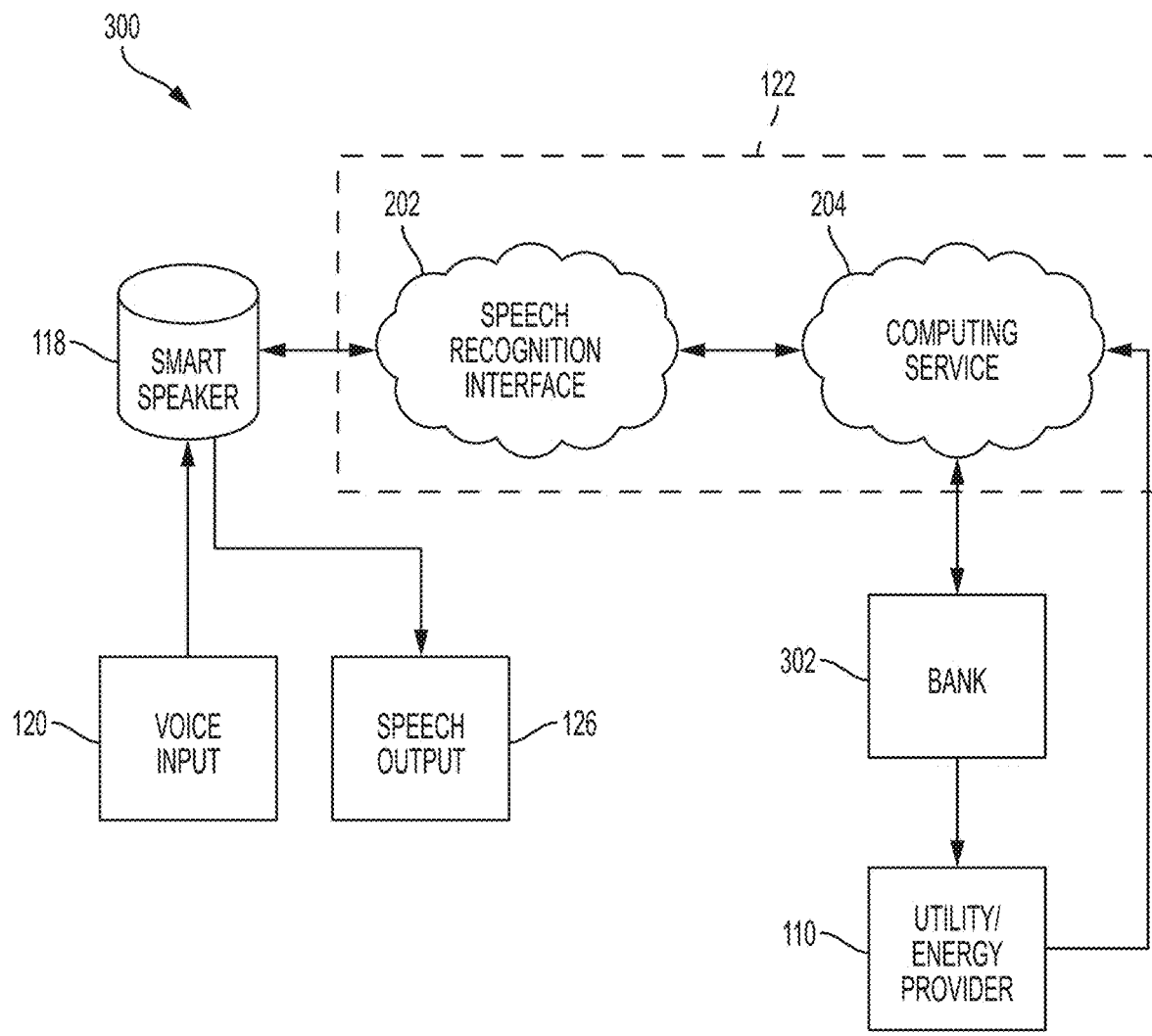
FIG. 3 is a block diagram illustrating an example of a data flow for voice-activated utility payment system, in accordance with one or more examples.

FIG. 3 is a block diagram illustrating an example of a data flow for a voice-activated utility payment system 200. Similar to the voice-activated management system 100 described above with respect to FIG. 1, the voice-activated utility payment system 200 uses the voice input 120 of a resource consumer at the smart speaker 118 to initiate payment of a utility bill from a bank 302 to a utility/energy provider 204.

When the smart speaker 118 receives the voice input 120, the smart speaker 118 provides the voice input 120 to the speech recognition interface 202. In one or more examples, the voice input 120 is a vocal request to initiate payment to the utility provider 110. For example, when the consumer receives the speech output 126 of FIG. 1 indicating that the consumer owes a specified amount of money for resource consumption, the consumer provides the vocal request to the smart speaker 118 to pay the money owed to the utility provider 110. In another example, the consumer may receive an indication from the speech output 126 that a prepaid utility balance is approaching zero after submitting a vocal request to determine the current prepaid utility balance associated with the consumer's account. In such an example, the consumer may add funds to the prepaid balance by providing a vocal request to add funds as the voice input 120. Other types of payment requests in the form of the voice input 120 to the smart speaker 118 are also contemplated within the scope of the present disclosure.

The speech recognition interface 202, or generally the voice service 122, receives the voice input 120 from the smart speaker 118, and processes the voice input 120 to characterize the request of the consumer as a specific processing task. For example, the speech recognition interface 202 converts the voice input 120 from audio data into text representations of the audio data. To finalize processing of the voice input 120, the speech recognition interface 202 interacts with the computing service 204. The computing service 204, for example, may be an event-driven, serverless computing platform.

The computing service 204, or generally the voice service 122, executes lines of code in response to tasks received or identified by the speech recognition interface 202. When the tasks are received by the computing service 204, the computing service 204 assigns computing resources to accomplish the tasks identified by the speech recognition interface 202. In one or more examples, the speech recognition interface 202 performs a speech-to-text operation on the voice input 120 and provides text data associated with the voice input 120 to the computing service 204. In such an example, the computing service 204 matches the text data associated with the voice input 120 to a register of known requests to determine a specific task that the computing service 204 is instructed to accomplish by the voice input 120. In an example, the specific task is to pay the utility provider 110 an outstanding balance associated with the consumer's resource consumption. In an additional example, the specific task is to provide additional funds to a prepaid utility account associated with the consumer in response to an indication that a balance of the prepaid account is depleted.

In one or more examples, the computing service 204 receives the text data associated with the voice input 120 and determines that the text data is requesting payment to the utility provider 110. The computing service 204 then performs a voice service request to a bank 302 requesting the transfer of funds from a bank account of the consumer to a bank account associated with the utility provider 110. In another example, the computing service 204 communicates with a credit card issuer (e.g., a payment services company 106) with which the consumer has an account to provide funds to a bank account associated with the utility provider 110. Additional examples include the computing service 204 communicating with a cryptocurrency blockchain to transfer cryptocurrency owned by the consumer to the utility provider 110 in exchange for resource consumption, or to sell the cryptocurrency and transfer the proceeds to the utility provider 110 in exchange for the resource consumption. In any example, the utility provider 110 is able to recover payment from the bank 302, the payment services company 106, or a cryptocurrency blockchain in exchange for providing resource consumables to the consumer. In an example, the voice service 122 may include an initialization process that securely links the smart speaker 118 with the bank 302 (e.g., using a bank account of the payor), the payment services company 106 (e.g., using a credit card account associated with the payor), or a cryptocurrency management company (e.g., using a cryptocurrency wallet file). The initialization process of payment options may occur as a default step associated with linking the smart speaker 118 to a utility account of the utility provider 110.

Upon receiving payment, the utility provider 110 may provide a payment received message to the computing service 204. At the computing service 204, the payment received message from the utility provider 110 is used to prepare a response to the original payment request. Once the response is generated in text form by the computing service 204 (e.g., "Your payment was received by your utility provider"), the speech recognition interface 202 performs a text-to-speech operation and provides the resulting audio data to the smart speaker 118 for transmission from the smart speaker 118 as the speech output 126.

In addition to integration with the utility payment system 300, the voice-activated management system 100 may also be integrated with home energy management devices. For example, the smart speaker 118 may communicate with smart thermostats associated with HVAC systems connected to the metering device 102, load control devices associated with other loads connected to the metering device 102, or other energy management devices to control the loads connected to the metering device 102 based on the real-time information received from the metering device 102. Communication from the smart speaker 118 to the home energy management devices may be accomplished when the computing service 204 generates appropriate commands and controls based on the voice input received at the smart speaker 118, and the computing service 204 provides the commands and controls to the home energy management devices using specific communication protocols of those devices. In controlling the loads based on the real-time information, the voice-activated management system 100 may avoid unexpectedly high utility bills by addressing the cause of the high utility bill early in a billing cycle (e.g., upon providing metrology data to the requestor).

Figure 4:
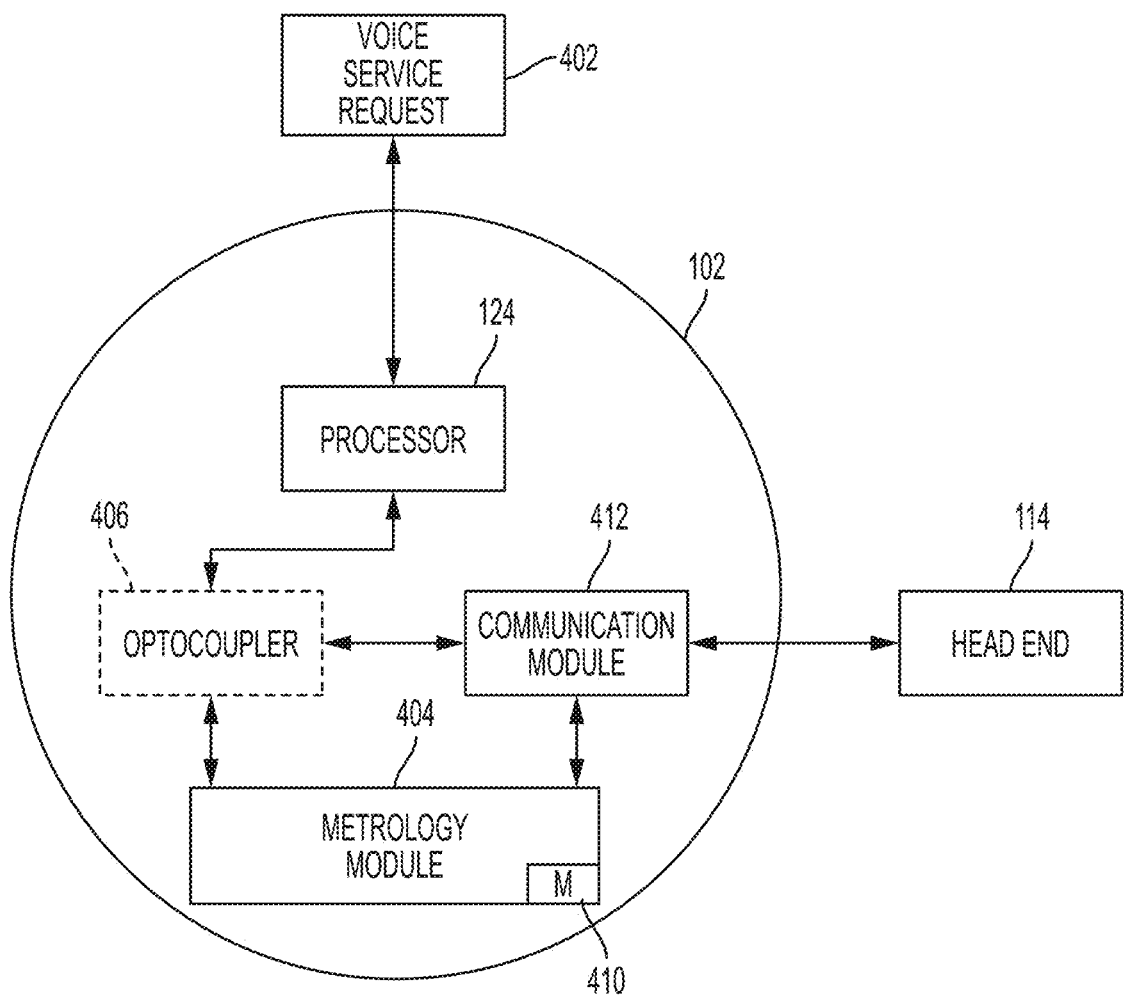
FIG. 4 depicts a block diagram illustrating an example of an endpoint in a utility network, in accordance with one or more examples.

FIG. 4 is a block diagram illustrating an example of an endpoint (e.g., the metering device 102) in a utility network. As discussed above with respect to FIG. 1, the metering device 102 communicatively couples directly to a component of the voice service 122 (e.g., the computing service 204) or to the voice service 122 through the optional proxy server 206. The voice service 122 provides a voice service request 402, which is derived from the vocal request received at the smart speaker 118, to the processor 124 of the metering device 102. In an example, the processor 124 may include a buffer that is used to store the request received from the voice service 122 until the processor 124 is able to process the request. The processor 124 may be located within a housing of the metering device 102 or located remote from the metering device 102. An IP address for the processor 124 may be dynamic, and the processor 124 may register with the optional proxy server 206 upon startup of the processor 124 or upon any changes to the IP address of the processor 124. In other examples, the processor 124 communicates directly with the voice service 122 without the use of the optional proxy server 206.

The processor 124 receives the voice service request 402 from the voice service 122 or the optional proxy server 206, parses the voice service request, and requests information from a metrology module 404 of the metering device 102. In an example, the request from the processor 124 to the metrology module 404 passes through an optocoupler 406. The optocoupler 406 may be an optical isolator that is able to transfer signals between two isolated circuits. In this manner, the metrology module 404 may be protected from, for example, voltage surges originating on the circuit that includes the processor 124. In other examples, the processor 124 is in direct communication with the metrology module 404 (e.g., the request does not go through the optocoupler 406 before being received at the metrology module 404).

The metrology module 404 meters resource consumption at the premises associated with the metrology module 404. In an example, the metrology module 404 includes a memory component 410 to store information relating to resource consumption at the premises. For example, the memory component 410 may store a final metering read for a most recent billing cycle such that the metrology module 404 is able to provide real-time information about resource consumption when queried. More robust storage is also contemplated. In one or more examples, the memory component 410 may store resource consumption data collected over a period of time (e.g., monthly resource consumption data over the previous year). The memory component 410 may also maintain resource consumption trends (e.g., resource consumption averages by month) or any other data that a consumer may request.

When the consumer requests information that is not available using the memory component 410 of the metrology module 404, the metrology module 404 may make use of a communications module 412 to query the head end system 114 for the additional data. In an example, the communications module 412 transmits the request from the consumer to a wireless mesh network, which is able to recover the information from the head end system 114, as discussed above with respect to FIG. 1. Other metering device networks connecting the metering device 102 and the head end system 114 other than the wireless mesh network are also contemplated. This additional information not locally available to the metrology module 404 may include account information such as current resource consumption billing rates, prepaid utility balances, past-due balances, or any other information relating the consumer's utility account that may be stored remotely from the metrology module 404. In another example, the metrology module 404 may provide an indication back to the computing service 204 indicating the information that is not available in the memory component 410, and the computing service 204 may query the head end system 114 directly to receive the information not available in the memory component 410 of the metrology module 404.

Upon receiving the requested information from the wireless mesh network, the metrology module 404 provides all of the requested information to the processor 124. The processor 124 outputs the requested information to the computing service 204. From the computing service 204, the requested information is processed and distributed to the smart speaker 118, as described above with respect to FIG. 1.

Figure 5:
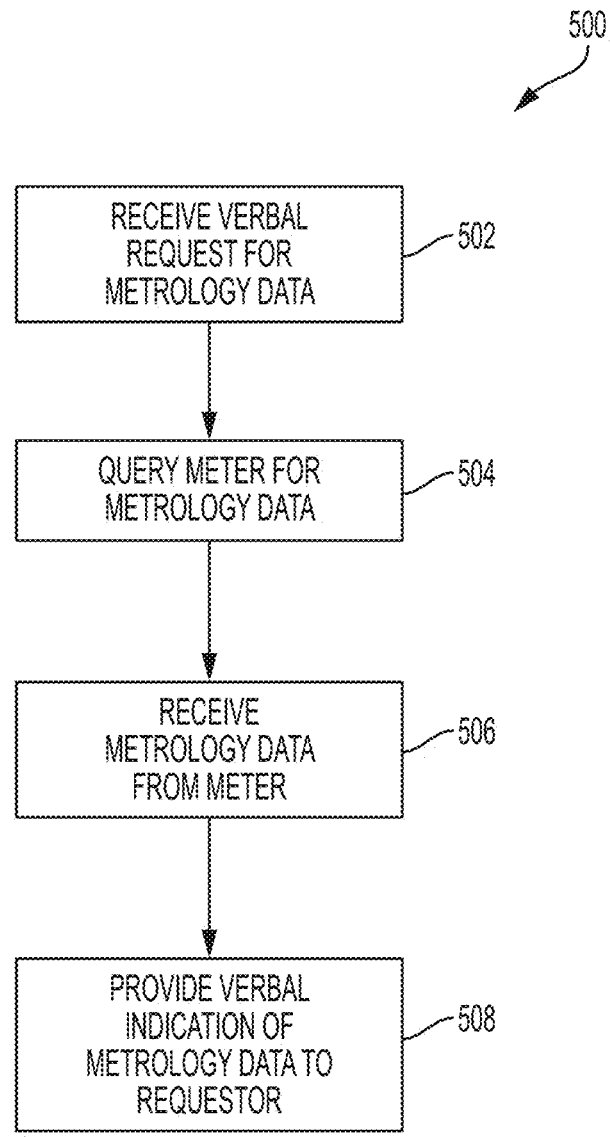
FIG. 5 is a flow chart of a process for receiving metrology data from a metering device in response to a voice-activated request, in accordance with one or more examples.

FIG. 5 is a flow chart of a process 500 for receiving metrology data (e.g., resource consumption information for a time period, an indication of an instant power consumption rate, a temperature of the metering device 102, or any other type of data that is recorded by the metering device 102) from a meter in response to a voice-activated request. At block 502, the process 500 involves receiving, from the smart speaker 118, a verbal request for metrology data from a consumer. The smart speaker 118 provides the verbal request to the speech recognition interface 202, which is capable of processing the verbal request into text using a speech-to-text function.

At block 504, the process 500 involves querying a metering device 102 for metrology data. By way of example, the text data generated at the speech recognition interface 202 is provided to the computing service 204, and the computing service sends a request for the metrology data to the metering device 102. In an example where the metering device 102 includes the processor 124 with a dynamic IP address, the computing service 204 funnels the request through the optional proxy server 206.

At block 506, the process 500 involves receiving the metrology data from the metering device 102. Similar to block 504, the metrology data may be received at the computing service 204 after the metering device 102 provides the metrology data to the optional proxy server 206. In an example where the metrology data includes a resource consumption billing rate in addition to a meter reading, the computing service 204 may combine the two values to provide the cost of resource consumption to date. In another example, the processor 124 may combine the two values to provide the cost of resource consumption prior to transmitting the data to the computing service 204. The computing service 204 may also perform other actions on the data received from the metering device 102 based on the specific information requested by the voice input 120.

At block 508, the process 500 involves providing a verbal indication of the metrology data to the requestor as the speech output 126. To provide the verbal indication to the requestor, the speech recognition interface 202 converts the textual data received from the computing service 204 and/or the processor 124 to an audible representation of the textual data. For example, the speech recognition interface 202 performs a text-to-speech operation on the data received from the computing service 204. The speech recognition interface 202 then provides the audible representation of the textual data to the smart speaker 118 to provide the speech output 126 to the data requestor (e.g., the resource consumer).

While FIG. 5 is described with respect to receiving metrology data, other data may be received from other sources using the same general process 500. For example, the verbal request could be information relating to utility provider account balances from the utility providers 110, information relating to operation of the IoT devices 104 associated with the smart speaker 118, information relating to the payment services companies 106, information from the communication platforms of appliance vendors 108, information from other sources relating to utility consumption, or any combination thereof.

Figure 6:
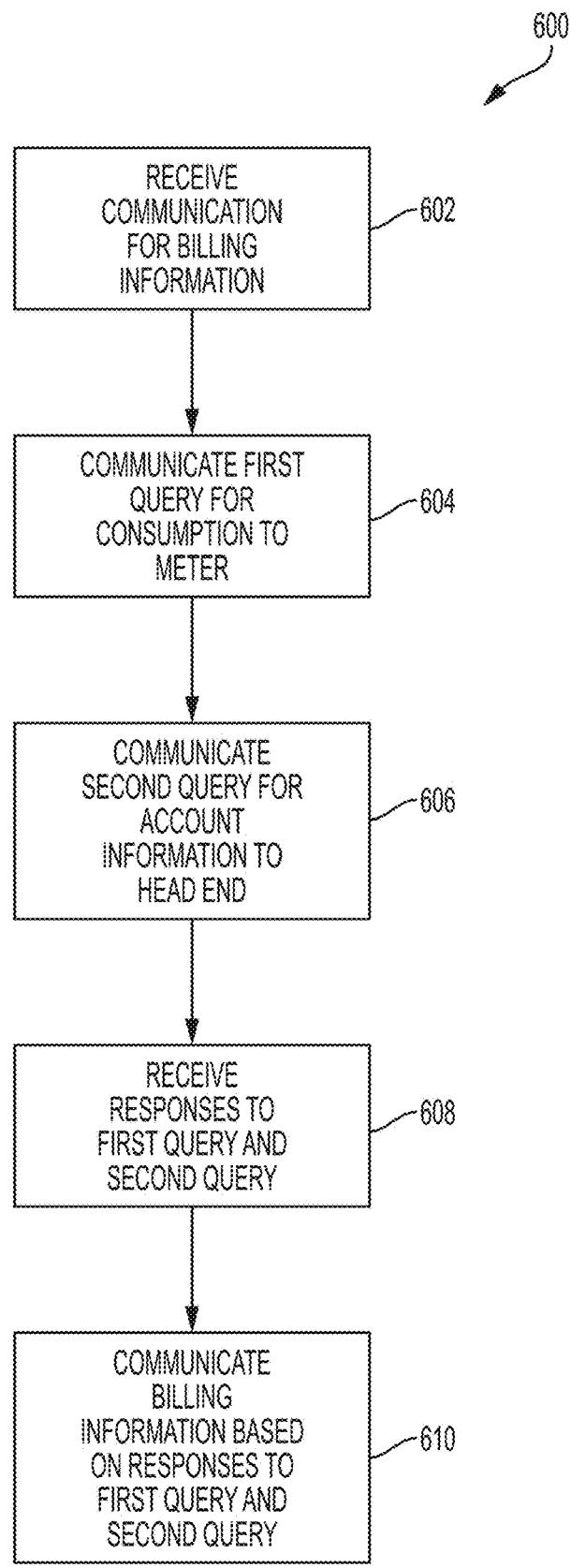
FIG. 6 is a flow chart of a process for communicating with a metrology module and a head end system in response to a voice-activated request received by a metering device, in accordance with one or more examples.

FIG. 6 is a flow chart of a process 600 for communicating with the metering module 404 and the head end system 114 of a utility system in response to a voice-activated request received by the metering device 102. At block 602, the process 600 involves receiving a communication requesting billing information at the metering device 102. In one or more examples, the billing information may include a resource consumption cost (e.g., price per kilowatt-hour), historical billing data, historical consumption information, account information, a prepaid utility balance, or any other data associated with a utility account that is not stored locally at the metering device.

At block 604, the process 600 involves communicating a first query for resource consumption to the metrology module 404 of the metering device 102. The first query involves a request for data that is stored locally on the metering device 102. For example, the first query may be a request for resource consumption data tracked by the metrology module 404 of the metering device 102. Other data stored locally at the metering device 102 (e.g., in the memory component 410 of the metrology module 404) may also be requested by the first query, such as an indication of an instant power, a temperature of the metering device 102, or any other type of data that is recorded by the metering device 102.

At block 606, the process 600 involves communicating a second query for account information to the head end system 114. The second query involves a request for data that is not stored locally on the metering device 102. For example, the second query may be a request for account information, historical resource usage information, or any other data that may be stored at the head end system 114. To communicate the second query to the head end system 114, the metering device 102 may receive a request for the information that is not stored locally at the metering device 102, and the metering device 102 may transmit the request to the wireless mesh network and ultimately to the head end system 114. In another example, the computing service 204 may provide the second query directly to the head end system 114 when the computing service 204 determines that the results of the second query are not stored locally at the metering device 102. The second query may also involve requests for information that are stored with other entities to which the computing service 204 may have access. For example, the second query may be a request to turn off one or more IoT devices 104 that are in communication with the voice service 122.

At block 608, the process 600 involves receiving responses to the first query and the second query. The response to the first query may be received from the metrology module 404 of the metering device 102. The response to the second query may be received at the voice service 122 from the network that provides communication between the voice service 122 and the head end system 114 or other data sources, or the response may be received at the metering device 102 from the wireless mesh network that communicatively couples the metering device 102 to the head end system 114. The computing service 204, or generally the voice service 122, may process the responses into a textual representation of the data requested by the consumer. In another example, the processor 124 may process the responses into the textual representation of the data requested by the consumer. The textual representation may undergo a text-to-speech operation at the speech recognition interface 202 to transform the textual representation of the data requested by the consumer into an audible representation of the data.

At block 610, the process 600 involves communicating the billing information to the consumer based on the responses to the first query and the second query. The audible representation of the data is provided to the smart speaker 118, and the smart speaker 118 transmits the data to the consumer as the speech output 126. Upon receiving the speech output 126, the consumer is able to request further information about the resource consumption, and the consumer is able to verbally request payment to the utility provider 110 based on the received information.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for responding to a voice activated request, comprising:

receiving, at a speech recognition interface, a speech input request from a smart speaker requesting energy management data associated with energy consumption at a premises of the smart speaker;

generating, by a computing service, a voice service request comprising a first query for a metering device, the first query comprising a request for the energy management data;

communicating, by the computing service, the first query to the metering device;

receiving, at the computing service, a first response to the first query from the metering device;

generating, by the speech recognition interface, an audible speech output in response to the speech input request based on the first response to the first query;

generating, by the computing service, a second query of the voice service request, wherein the second query comprises a request for energy management data from a head end system;

communicating, by the computing service, the second query to the head end system;

receiving, at the computing service, a second response to the second query from the head end system, wherein the head end system requests updated energy management data from the metering device upon receiving the second query; and transmitting, by the speech recognition interface, the audible speech output to the smart speaker, wherein the smart speaker is configured to audibly transmit the audible speech output, and wherein the audible speech output is generated based on the first response and the second response.

2. The method of claim 1, wherein the head end system is associated with the metering device.

3. The method of claim 1, wherein the head end system is associated with a utility provider, and the energy management data from the head end system comprises data associated with the energy consumption at the premises of the smart speaker over a specified time period.

4. The method of claim 1, wherein generating the audible speech output comprises:

generating a text representation of the audible speech output; and performing a text-to-speech operation on the text representation.

5. The method of claim 1, wherein generating the voice service request comprises:

performing a speech-to-text operation on the speech input request to generate a text representation of the speech input request; and matching the text representation to a register of known requests to determine the voice service request.

6. The method of claim 1, comprising:

calculating a utility bill based on resource consumption information and account information received from the first response, wherein the audible speech output comprises an audible representation of the utility bill.

7. The method of claim 6, comprising:

receiving an additional speech input request from the smart speaker;

generating an additional voice service request comprising a payment submission in response to the audible speech output;

communicating the payment submission to a payment servicing company;

receiving an additional response from the payment servicing company indicating successful payment of the utility bill;

generating an additional audible speech output in response to the additional speech input request based on an indication of the successful payment of the utility bill; and transmitting the additional audible speech output to the smart speaker.

8. A method for responding to a voice activated request, comprising:

receiving, at a speech recognition interface, a speech input request from a smart speaker;

generating, by a computing service, a voice service request based on the speech input request, wherein the voice service request comprises a query for an energy consumption data source;

communicating, by the computing service, the query to the energy consumption data source;

receiving, at the computing service, a response to the query from the energy consumption data source;

generating, by the speech recognition interface, an audible speech output in response to the speech input request based on the response to the query;

generating, by the computing service, a second query of the voice service request, wherein the second query comprises a request for energy management data from an energy account data source;

communicating, by the computing service, the second query to the energy account data source; and receiving, at the computing service, a second response to the second query from the energy account data source, wherein the energy account data source requests updated energy management data from the energy consumption data source upon receiving the second query; and transmitting, by the speech recognition interface, the audible speech output to the smart speaker, wherein the smart speaker is configured to audibly transmit the audible speech output, and wherein the audible speech output is generated based on the response and the second response.

9. The method of claim 8, wherein the energy consumption data source comprises a metering device, an interne of things device, a payment services company, a utility provider, or any combination thereof.

* * * * *